Oct. 7, 1941.   F. G. CLIPPER   2,258,317
ANTPROOF DOME
Filed May 14, 1940
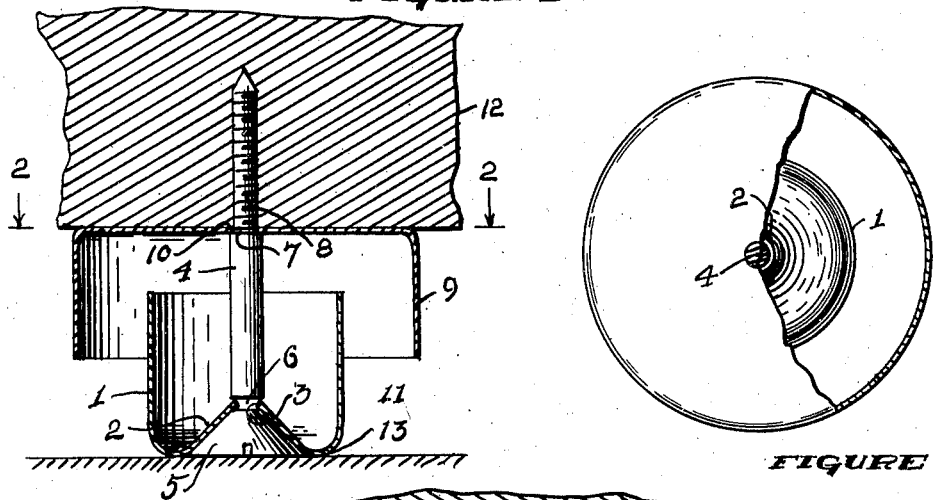
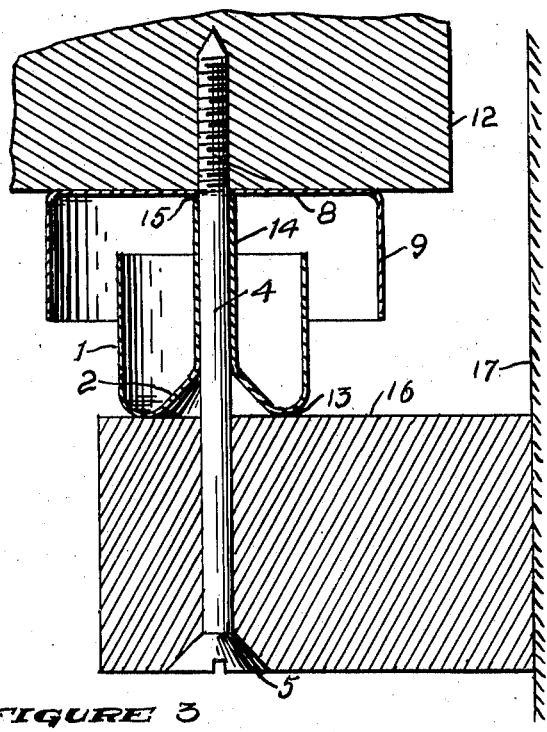
INVENTOR
Forrest G. Clipper
John A. Naismith
ATTORNEY Patented Oct. 7, 1941

2,258,317

UNITED STATES PATENT OFFICE 2,258,317

ANTPROOF DOME

Forrest G. Clipper, San Jose, Calif.

Application May 14, 1940, Serial No. 335,121

2 Claims. (Cl. 43—109)

The present invention relates particularly to means for holding and protecting an ant repellent substance, and for supporting a food receptacle in a fixed spaced relation to said substance.

It is common practice to support shelves and food receptacles of various kinds on legs seated in water or a liquid which ants cannot cross, and it has not been practicable, heretofore, to use an ant repellent substance of a permanent nature because it would, in the devices commonly used, soon become crusted over with dust and dirt forming a pathway for the ants. Furthermore, known ant repellents are of such a nature that even when not in a liquid form the ants are caught therein and in a little time their bodies form a bridge for the invading hosts.

I have provided an ant repelling composition which will be effective for a long period of time and which does not entrap the ants as above described, and therefore it is the object of the present invention to provide a container for this substance that will protect it against contamination with foreign substances or liquids, that will prevent access thereto by children and animals, that will be a solid, substantial, and practical for mounting upon the receptacle upon which the food to be protected is placed, and that will carry the substance in such a position and quantity as to effectually bar ants from the food receptacle.

It is also an object of the invention to provide a means of the character indicated so constructed and arranged that but few and simple parts are required in its manufacture, that will be economical to manufacture, that will be strong, durable, and highly efficient in its practical application.

In the drawing:

Figure 1 is a vertical transverse section through a device embodying my invention in position on a supported shelf, partly in elevation.

Figure 2 is a view on line 2—2 of Figure 1, with a part broken away.

Figure 3 is a vertical transverse section through another embodiment of the device.

In the embodiment of the invention shown in Figures 1 and 2, I show at 1 a sheet aluminum cup having its bottom projected upwardly to form a cone as at 2 in concentric relation to the side wall of the cup, the central portion of the conical part 2 having a hole 3 formed therein.

At 4 is shown the body portion, or stem, of a screw, its head 5 being seated within the conical part 2, and an annular groove 6 at the base of the head 5 receiving the top edge of the cone portion as shown. In assembling these parts the hole 3 is at first just large enough to permit the passage of the screw stem 4 therethrough, but when the head 5 is seated against the inner side of the conical part 2 the top circular edge of the said part 2 is pressed into the groove 6, thereby securing the two parts 1 and 4 in fixed relation to each other with the screw extending centrally upwardly.

The screw body 4 is provided with a shoulder at 7 a little above the top level of the cup 1 and lying in a horizontal plane, the terminal portion of the screw being threaded as at 8 in the usual way.

At 9 is shown an inverted cup of somewhat larger diameter than the cup 1, and having a depth greater than the spacing of the shoulder 7 above the top level of the cup 1. This cup 9 is tapped at 10, its center, and is threaded on the screw, in inverted relation to cup 1, until it seats on the shoulder 7 where it assumes the position shown, completely encompassing the upper portion of cup 1.

When the ant repellent material is placed in the cup 1 as indicated at 11 and the several parts assembled as described, it is only necessary to seat the screw 4 in the bottom of the shelf or other food container 12. With four of these devices mounted upon the under side of a shelf they form solid substantial supports therefor, and at the same time effectually prevent ants from reaching the shelf because while they may enter the cup 1 they will not be able to reach the screw body 4.

Since the substance 11 is of such a nature that it does not have to be replenished, or replaced, from time to time, the cup 1 does not have to be easily accessible, and the overlapping of the cups may be quite considerable, and their spacing but little.

Another feature of this method of construction is that the solid support of the shelf 12 is the screw 4 and the bottom portion of the cup 1 cooperating with the screw. Since the conical portion 2 of the cup 1 forms a solid seat for the screw head 5 and is also seated in the groove 6, the portion 13 is, in effect, an extension of the flat screw head 5 with the advantage that the cup itself cooperates with the screw to form a solid base.

Again, since the cup 9 seats upon the shoulder 7, and the shelf 12 seats upon the entire cup 9 and consequently on shoulder 7, it follows that when assembled the whole structure becomes, in effect, one integral unit.

In the embodiment shown in Figure 3 the cup 1 is provided with a conical portion 2 drawn into a tube 14 extending above the top level of the cup to the point 15 where its top end functions in exactly the same manner as the shoulder 7. In this case an ordinary screw of the desired size may be used with its head seated in the conical part 2, or the screw may be driven upwardly through a supporting ledge as 16 mounted on a wall 17, thence passing through the tube 14 and into the shelf 12.

Although but two specific embodiments of the invention have been herein illustrated and described, it will be understood that various alterations in the details of construction and mode of assembly may be made without departing from the scope of the invention as indicated in the appended claims.

I claim:

1. A device of the character described comprising, a shelf supporting device including a cup-shaped element having a screw passing axially therethrough with its head seated in the bottom thereof, and having a shoulder formed thereon at a point spaced above the top level of the cup, an inverted cup-shaped member seated on the shoulder to encompass the cup-shaped element, the screw being threaded from the shoulder to its adjacent end to permit its entering the shelf to the shoulder.

2. A device of the character described comprising, a screw having an annular groove formed therein adjacent its head and a shoulder formed thereon in spaced relation to the groove and threaded from the shoulder to the adjacent end, a cup-shaped element having a truncated-cone shaped bottom seated upon the screw head and engaging said groove, and an inverted cup-shaped member seated on said shoulder to overlie and encircle the first mentioned cup and in spaced relation thereto.

FORREST G. CLIPPER.